United States Patent
Shao et al.

(10) Patent No.: US 12,394,868 B2
(45) Date of Patent: Aug. 19, 2025

(54) ELECTRODE ASSEMBLY, AND ELECTROCHEMICAL APPARATUS AND ELECTRONIC APPARATUS INCLUDING SUCH ELECTRODE ASSEMBLY

(71) Applicant: Ningde Amperex Technology Limited, Fujian (CN)

(72) Inventors: Ying Shao, Fujian (CN); Yibo Zhang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 366 days.

(21) Appl. No.: 17/953,656

(22) Filed: Sep. 27, 2022

(65) Prior Publication Data
US 2023/0024456 A1    Jan. 26, 2023

Related U.S. Application Data

(63) Continuation of application No. PCT/CN2020/081824, filed on Mar. 27, 2020.

(51) Int. Cl.
*H01M 50/00* (2021.01)
*H01M 50/474* (2021.01)
(Continued)

(52) U.S. Cl.
CPC ....... *H01M 50/474* (2021.01); *H01M 50/483* (2021.01); *H01M 50/486* (2021.01); *H01M 50/491* (2021.01); *H01M 50/536* (2021.01)

(58) Field of Classification Search
CPC ......... H01M 10/0569; H01M 10/0568; H01M 10/052; Y02E 60/10
See application file for complete search history.

(56) References Cited

U.S. PATENT DOCUMENTS

2016/0164065 A1* 6/2016 Liu ..................... H01M 50/414
  429/61
2017/0263906 A1  9/2017 Sugata et al.
2020/0044234 A1* 2/2020 Zeng ................. H01M 10/0525

FOREIGN PATENT DOCUMENTS

CN    202758971 U    2/2013
CN    103168384 A    6/2013
(Continued)

OTHER PUBLICATIONS

Kim et al., Electrode, Secondary Battery Using Same, and Method for Manufacturing Electrode, Mar. 2019, See the Abstract. (Year: 2019).*

(Continued)

*Primary Examiner* — Niki Bakhtiari
*Assistant Examiner* — Monique M Wills
(74) *Attorney, Agent, or Firm* — Maier & Maier, PLLC

(57) ABSTRACT

An electrode assembly includes an electrode plate and an embedded tab provided on the electrode plate. A spinning layer is provided on a surface of the electrode plate, the spinning layer covers the surface of the electrode plate and is in contact with the surface of the electrode plate, and the surface of the electrode plate includes a surface of the tab. The spinning layer replaces a conventional separator, and the spinning layer and the electrode plate are integrated as a whole. Especially in a battery structure with the embedded tabs, because the spinning layer is able to isolate metal burrs. The spinning layer replaces the green glue originally affixed on the tab region, thereby eliminating the glue affixed on the tab region.

15 Claims, 2 Drawing Sheets

(51) Int. Cl.
H01M 50/483 (2021.01)
H01M 50/486 (2021.01)
H01M 50/491 (2021.01)
H01M 50/536 (2021.01)

(56) References Cited

FOREIGN PATENT DOCUMENTS

| | | | |
|---|---|---|---|
| CN | 104518191 A | 4/2015 | |
| CN | 105914339 A | 8/2016 | |
| CN | 105990612 A | 10/2016 | |
| CN | 106129327 A | 11/2016 | |
| CN | 106450494 A | 2/2017 | |
| CN | 107516721 A | 12/2017 | |
| CN | 107579190 A | 1/2018 | |
| CN | 110224097 A | 9/2019 | |
| CN | 110224170 A | 9/2019 | |
| JP | 2003109654 A | 4/2003 | |
| JP | 201754706 A | 3/2017 | |
| JP | 2020004684 A | 1/2020 | |
| JP | 7254941 B2 | 4/2023 | |
| KR | 101585839 B1 | 1/2016 | |
| WO | WO-2019045407 A2 * | 3/2019 | ............. B01D 71/42 |
| WO | WO-2019236371 A2 * | 12/2019 | .......... H01M 10/052 |

OTHER PUBLICATIONS

He et al., Fire-Resistant Lithium Battery Containing an Electrode-Protecting Layer, Dec. 2019, See the Abstract. (Year: 2019).*
Office Action issued on Jan. 20, 2023, in corresponding Chinese Application No. 202080095620.1, 14 pages.
Office Action issued on Sep. 5, 2023, in corresponding Chinese Application No. 202080095620.1, 20 pages.
Extended European Search Report issued on May 2, 2023, in corresponding European Application No. 20927326.7, 8 pages.
International Search Report with English translation issued on Dec. 28, 2020, in corresponding International Application No. PCT/CN2020/081824; 7 pages.
Written Opinion with English translation issued on Dec. 28, 2020, in corresponding International Application No. PCT/CN2020/081824; 6 pages.
Office Action issued on Feb. 20, 2025, in corresponding Korean Application No. 10-2022-7033835, 17 pages.
Office Action issued on Sep. 12, 2023, in corresponding Japanese Application No. 2022-549198, 4 pages.
Office Action issued on Oct. 18, 2023, in corresponding Indian Application No. 202227059655, 5 pages.
Notice of Allowance issued on Mar. 5, 2024, in corresponding Japanese Application No. 2022-549198, 5 pages.
Office Action issued on Apr. 29, 2024, in corresponding Chinese Application No. 202080095620.1, 20 pages.
Office Action issued on Feb. 29, 2024, in corresponding Chinese Application No. 202080095620.1, 29 pages.

* cited by examiner

ELECTRODE ASSEMBLY, AND ELECTROCHEMICAL APPARATUS AND ELECTRONIC APPARATUS INCLUDING SUCH ELECTRODE ASSEMBLY

CROSS REFERENCES TO RELATED APPLICATIONS

The present application is a national phase application of PCT application PCT/CN2020/081824, filed on Mar. 27, 2020, the disclosure of which is hereby incorporated by reference in its entirety.

TECHNICAL FIELD

This application relates to the electrochemical field, and specifically, to an electrode assembly, and an electrochemical apparatus and an electronic apparatus including such electrode assembly.

BACKGROUND

Embedded tabs are frequently used in pouch batteries due to their advantages of increasing energy density, reducing impedance in lithium-ion batteries, achieving charging and discharging at high rates, and the like. However, in electrode assemblies with an embedded tab structure, because metal tabs have burrs, overhang (overhang) needs to be guaranteed, and the like, it is necessary to apply green glue to the embedded tabs, and part of the green glue covers a membrane region, resulting in loss of part of active substance capacity and causing waste of capacity. Additionally, under the condition of dropping, because of the acceleration during falling, electrolyte has a specific scouring force on a separator, which easily causes the separator to be folded, turned over, creased, or the like, resulting in short circuits between positive and negative electrodes, and causing safety hazards to lithium-ion batteries.

SUMMARY

In view of shortcomings of the prior art, this application provides an electrode assembly, where an electrode plate thereof does not need to be affixed with green glue, thereby increasing capacity of an electrochemical apparatus and enhancing safety of the electrochemical apparatus.

According to a first aspect of this prevention, this prevention provides an electrode assembly, which includes:
  an electrode plate and an embedded tab provided on the electrode plate, where
  a spinning layer is provided on a surface of the electrode plate, the spinning layer covers the surface of the electrode plate and is in contact with the surface of the electrode plate, and the surface of the electrode plate includes a surface of the tab.

In some embodiments, puncture resistance of the spinning layer on the surface of the tab is higher than puncture resistance of the spinning layer out of the surface of the tab.

In some embodiments, a porosity and/or a pore diameter of the spinning layer on the surface of the tab is less than a porosity and/or a pore diameter of the spinning layer out of the surface of the tab;
and/or
  a thickness of the spinning layer on the surface of the tab is greater than a thickness of the spinning layer out of the surface of the tab.

In some embodiments, upper and lower edges of the spinning layer are 0.1 mm to 10 mm wider than upper and lower edges of the electrode plate.

In some embodiments, the spinning layer includes a polymer, and the polymer includes at least one of polyvinylidene fluoride, polyimide, polyamide, polyacrylonitrile, polyethylene glycol, polyacrylonitrile, polyethylene oxide, polyphenylene oxide, polypropylene carbonate, polymethyl methacrylate, polyethylene glycol terephthalate, poly(vinylidene fluoride-hexafluoropropylene), poly(vinylidene fluoride-co-chlorotrifluoroethylene), polyethylene oxide, or derivatives thereof.

In some embodiments, the spinning layer further includes inorganic particles and/or low-melting-point polymer particles.

In some embodiments, the inorganic particles include at least one of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate, lithium titanium phosphate, lithium aluminum titanium phosphate, lithium lanthanum titanate, lithium germanium thiophosphate, lithium nitride, $SiS_2$ glass, $P_2S_5$ glass, $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramics, or garnet ceramics.

In some embodiments, the low-melting-point polymer particles include at least one of polystyrene, polyethylene, ethylene-propylene copolymer, ethylene-vinyl acetate copolymer, acrylonitrile-butadiene-styrene, polylactic acid, polyvinyl chloride, polyvinyl butyral, or polyacrylate.

In some embodiments, a particle size of the inorganic particle and/or the low-melting-point polymer particle ranges from 0.001 μm to 10 μm.

In some embodiments, the spinning layer satisfies at least one of the following characteristics:
  the porosity of the spinning layer ranges from 30% to 95%;
  the pore diameter of the spinning layer ranges from 20 nm to 30 μm; and
  the thickness of the spinning layer ranges from 1 μm to 20 μm.

This application further provides an electrochemical apparatus which includes the electrode assembly according to any one of the foregoing descriptions.

This application further provides an electronic apparatus which includes the foregoing electrochemical apparatus.

In this application, a spinning layer is used for replacing a conventional separator, and the spinning layer and an electrode plate are integrated as a whole. Especially in an electrode assembly with an embedded tab, because the spinning layer is able to isolate metal burrs, the spinning layer can be used to replace green glue, thereby eliminating the need for the glue on a surface of a tab; and because the spinning layer does not block transport of lithium ions, capacity of part of a positive electrode active material originally covered by the green glue can be exerted normally, thereby increasing energy density of an electrochemical apparatus.

REFERENCE SIGNS

1. Positive electrode tab
2. Welding region of tab
3. Negative electrode tab
4. Spinning layer

DETAILED DESCRIPTION

To make the objectives, technical solutions, and advantages of this application more comprehensible, the following describes this application in detail with reference to accompanying drawings and embodiments. Apparently, the described embodiments are merely some but not all of the embodiments of this application. All other embodiments obtained by a person of ordinary skill in the art based on the embodiments of this application without creative efforts shall fall within the protection scope of this application.

An electrode assembly in this application may be any electrode assembly applied to an electrochemical apparatus. The electrochemical apparatus may include a lithium-ion battery, a super capacitor, and the like. The following uses an electrode assembly of a lithium-ion battery as an example for description. A person skilled in the art should understand that the following descriptions are merely as an example, and does not limit the protection scope of this application.

This application provides an electrode assembly, which includes
  an electrode plate and an embedded tab provided on the electrode plate, where
  a spinning layer is provided on a surface of the electrode plate, the spinning layer covers the surface of the electrode plate and is in contact with the surface of the electrode plate, and the surface of the electrode plate includes a surface of the tab.

In this specification, the embedded tab means that the electrode plate includes a current collector and a membrane, and the tab is welded on the current collector. The tab and the current collector are usually welded, and during welding, metal burrs are produced at a junction between the tab and the current collector. The spinning layer is provided to cover a surface of the tab, which can replace green glue used on the electrode plate, thereby increasing usable membrane area, increasing energy density, and improving other performances.

In this application, the electrode plate may be a positive electrode plate or a negative electrode plate.

Figure 1:
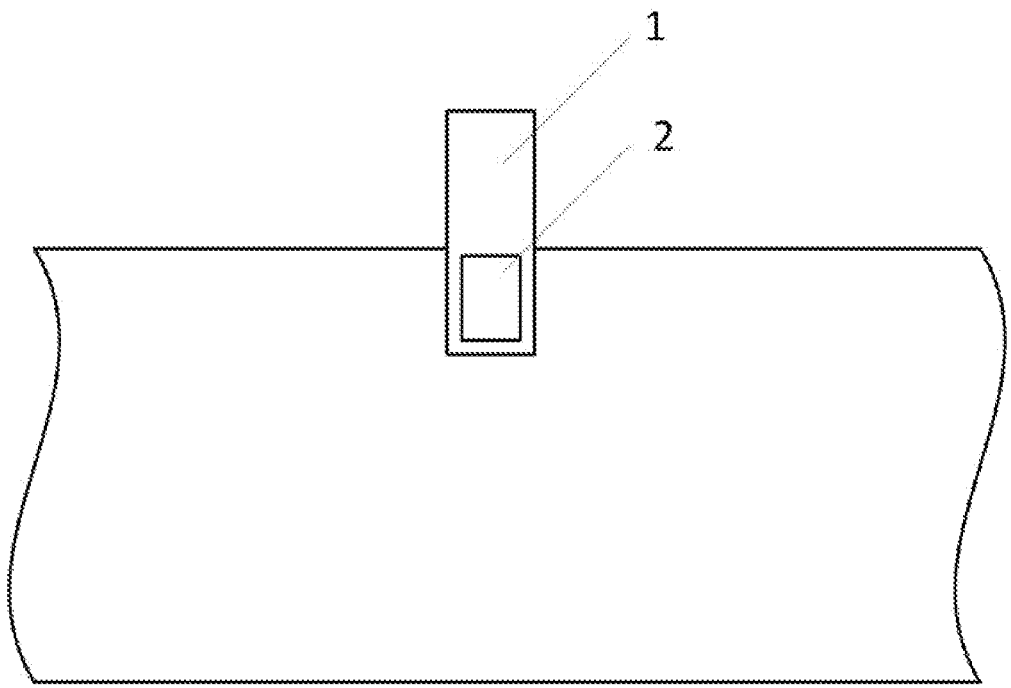
FIG. 1 is a schematic structural diagram of an electrode plate having an embedded tab.

The electrode plate being a positive electrode plate is used as an example. FIG. 1 shows a structure of a positive electrode plate having an embedded tab, where the positive electrode plate is provided with a positive electrode tab 1 and a welding region 2.

Figure 2:
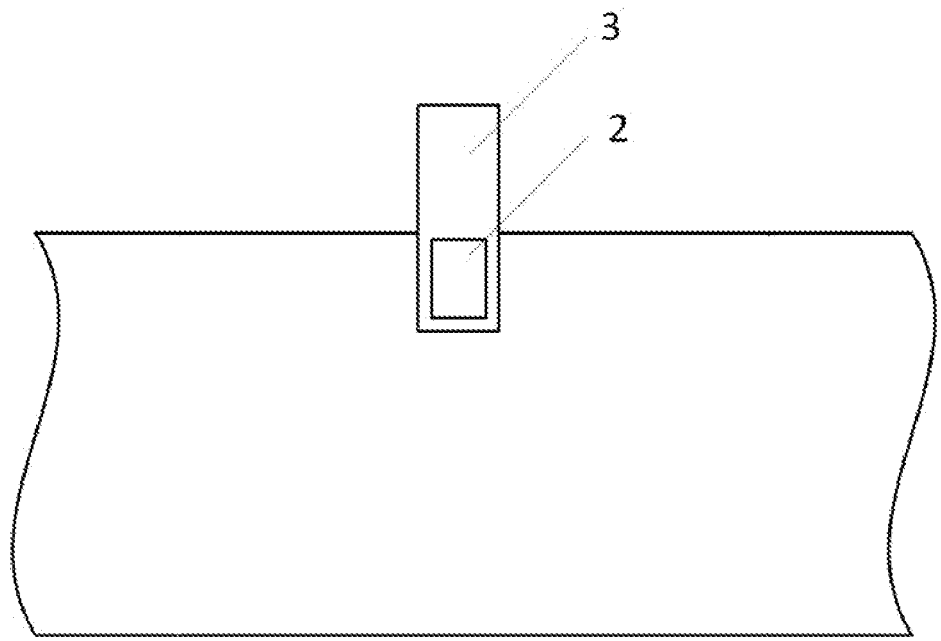
FIG. 2 shows a structure of an electrode assembly according to an embodiment of this application.

The electrode plate being a negative electrode plate is used as an example. FIG. 2 shows a structure of a negative electrode plate having an embedded tab, and specifically shows that the negative electrode plate is provided with a negative electrode tab 3 and a welding region 2.

In some embodiments, puncture resistance of the spinning layer on the surface of the tab is higher than puncture resistance of the spinning layer out of the surface of the tab. Because metal burrs are produced during welding of the tab, the foregoing technical solution is adopted to effectively ensure that the spinning layer fully covers the metal burrs, avoiding accidents such as a short circuit.

In some embodiments, a porosity and/or a pore diameter of the spinning layer on the surface of the tab is less than a porosity and/or a pore diameter of the spinning layer out of the surface of the tab;
  and/or
  a thickness of the spinning layer on the surface of the tab is greater than a thickness of the spinning layer out of the surface of the tab.

In some embodiments, upper and lower edges of the spinning layer are 0.1 mm to 10 mm, preferably 0.5 mm to 2 mm, wider than upper and lower edges of the electrode plate respectively.

Figure 3:
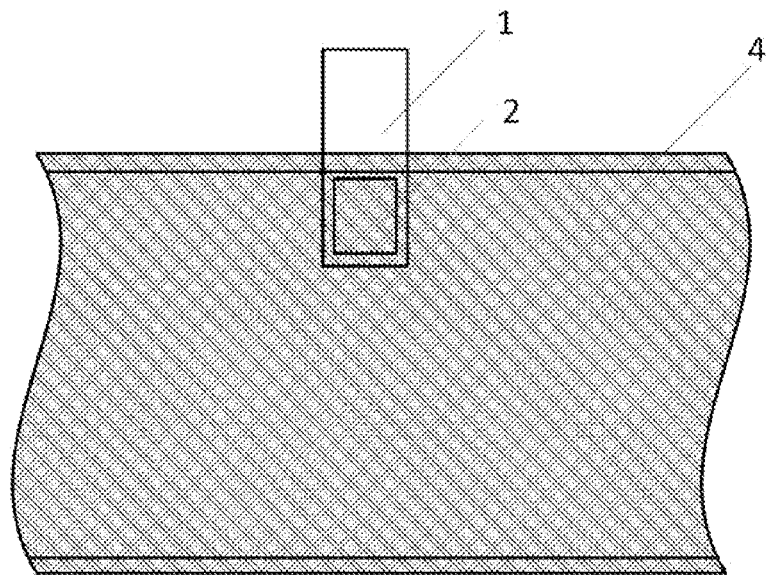
FIG. 3 shows a structure of an electrode assembly according to an embodiment of this application.

The electrode plate being a positive electrode plate is used as an example. As shown in FIG. 3, the spinning layer 4 covers the entire positive electrode plate, and upper and lower edges of the spinning layer are wider than upper and lower edges of the positive electrode plate respectively.

Figure 4:
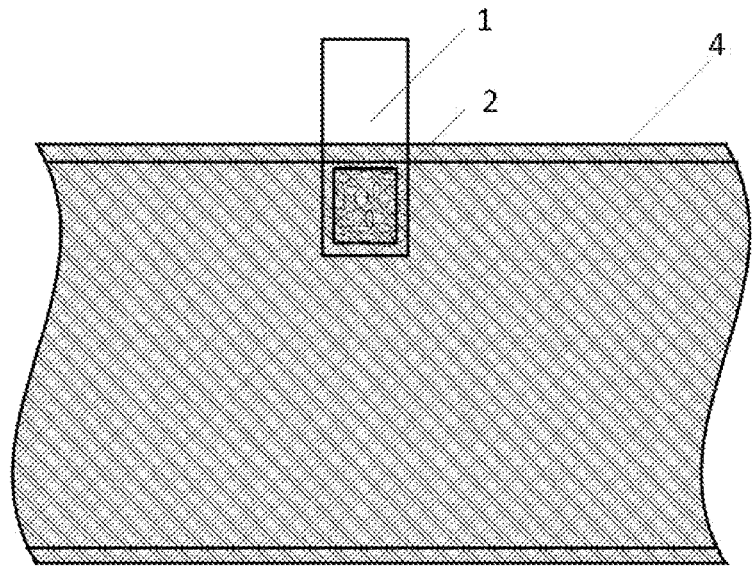
FIG. 4 shows a structure of a negative electrode plate of an electrode assembly according to an embodiment of this application.

FIG. 4 shows a structure of an electrode assembly according to an embodiment of this application. The spinning layer 4 covers the entire positive electrode plate, and puncture resistance of the spinning layer on the surface of the tab 1 is higher than puncture resistance of the spinning layer out of the surface of the tab.

In some embodiments, the spinning layer includes at least one of polyvinylidene fluoride (PVDF), polyimide (PI), polyamide (PA), polyacrylonitrile (PAN), polyethylene glycol (PEG), polyethylene oxide (PEO), polyphenylene oxide (PPO), polypropylene carbonate (PPC), polymethyl methacrylate (PMMA), polyethylene terephthalate (PET), poly (vinylidene fluoride-hexafluoropropylene) (PVDF-HFP), poly(vinylidene fluoride-co-chlorotrifluoroethylene) (PVDF-PCTFE), or derivatives thereof, preferably at least one of polyvinylidene fluoride, polyimide, polyamide, polyacrylonitrile, polyethylene glycol, polyethylene oxide, polyphenylene oxide, polypropylene carbonate, polymethyl methacrylate, polyethylene terephthalate, or derivatives thereof.

In some embodiments of this application, the spinning layer is formed by directional or random combination of nanofibers prepared from polymers, and a large number of pores for transporting ions are formed by random bonding among nanofibers. There is good adhesion between the spinning layer composed of nanofibers and the electrode plate, which can effectively prevent a separator from being folded due to washing by electrolyte in a lithium-ion battery fall, enhancing safety of the lithium-ion battery. In some embodiments, the spinning layer further includes inorganic particles and/or low-melting-point polymer particles.

In some embodiments, the inorganic particles include at least one of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate, lithium titanium phosphate, lithium aluminum titanium phosphate, lithium lanthanum titanate, lithium germanium thiophosphate, lithium nitride, $SiS_2$ glass, $P_2S_5$ glass, $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramics, or garnet ceramics.

In some embodiments, the low-melting-point polymer particles include at least one of polystyrene, polyethylene, ethylene-propylene copolymer, ethylene-vinyl acetate copolymer, acrylonitrile-butadiene-styrene, polylactic acid, polyvinyl chloride, polyvinyl butyral, or polyacrylate.

In some embodiments, a particle size of the inorganic particle and/or the low-melting-point polymer particle ranges from 0.001 μm to 10 μm.

In some embodiments, the spinning layer satisfies at least one of the following characteristics:
the porosity of the spinning layer ranges from 30% to 95%;
the pore diameter of the spinning layer ranges from 20 nm to 30 μm; and
the thickness of the spinning layer ranges from 1 μm to 20 μm.

The inventors, not based on any theory, believe that a porosity of the spinning layer being within the preceding range can ensure ionic conductivity. An excessively small porosity blocks an ion transport pathway, affecting normal cycling of the lithium-ion battery. An excessively large porosity leads to structural instability and too poor mechanical strength to resist puncturation by particles on a surface of the electrode plate, which easily causes local short circuits between positive and negative electrodes, resulting in electrical performance degradation and severe self-discharge.

The pore diameter of the spinning layer being within the preceding range can ensure that the separator has appropriate mechanical strength. An excessively small pore diameter leads to insufficient pathways to transport ions, affecting normal cycling of the lithium-ion battery. An excessively large pore diameter leads to too poor mechanical strength at pores to resist puncturation by particles on a surface of the electrode plate, which easily causes local short circuits between the positive and negative electrodes, resulting in electrical performance degradation and severe self-discharge.

The thickness of the spinning layer ranges from 1 μm to 20 μm, helping increase energy density of the lithium-ion battery.

In some embodiments of this application, the spinning layer is prepared by electrospinning, air spinning, centrifugal spinning, electroblowing, melt blowing, flash evaporation, or coating.

No particular limitation is imposed on the sequence in which nanofibers, inorganic particles, and/or low-melting-point polymer particles are deposited, provided that they are able to form the spinning layer in this application. For example, nanofibers and inorganic particles and/or low-melting-point polymer particles may be deposited simultaneously or alternately.

Deposition of nanofibers may be implemented with any spinning equipment known in the art, no particular limitation is imposed thereto, provided that the objective of this application can be achieved. Any spinning equipment known in the art may be used, for example, the electrospinning equipment may be Ucalery Elite series, the air spinning equipment may be an air jet spinning machine from Janus New-Materials Co., Ltd; and the centrifugal spinning equipment may be a centrifugal spinning machine from Sichuan Zhiyan Technology Co., Ltd.

This application further provides an electrochemical apparatus, which includes the aforementioned electrode assembly. The electrochemical apparatus may be a lithium-ion battery.

In an embodiment of this application, the positive electrode plate is not particularly limited, provided that the objective of this application can be achieved. For example, the positive electrode plate includes a positive electrode current collector and a positive electrode membrane. The positive electrode current collector may be any positive electrode current collector well known in the art, for example, an aluminum foil current collector, an aluminum alloy foil current collector, or a composite current collector. The positive electrode membrane includes a positive electrode active material. The positive electrode active material is not particularly limited in this application, and may be any positive electrode active material in the prior art. The active material may include at least one of NCM811, NCM622, NCM523, NCM111, NCA, lithium iron phosphate, lithium cobalt oxide, lithium manganate oxide, lithium manganese iron phosphate, or lithium titanate.

Optionally, the positive electrode plate may further include a conductive layer, where the conductive layer is located between the positive electrode current collector and the positive electrode membrane. Composition of the conductive layer is not particularly limited, and the conductive layer may be a conductive layer commonly used in the art. For example, the conductive layer includes a conductive agent and a binder.

In an embodiment of this application, the negative electrode plate is not particularly limited, provided that the objective of this application can be achieved. For example, the negative electrode plate includes a negative electrode current collector and a negative electrode membrane. The negative electrode current collector is not particularly limited, and any negative electrode current collector known in the art may be used, such as a copper foil current collector, a copper alloy foil current collector, and a composite current collector. The negative electrode membrane includes a negative electrode active material. The negative electrode active material is not particularly limited, and any negative electrode active material well known in the art may be used. For example, the negative electrode active material may include at least one of graphite, silicon, silicon carbon, or the like.

Optionally, the negative electrode plate may further include a conductive layer, where the conductive layer is located between the negative electrode current collector and the negative electrode membrane. Composition of the conductive layer is not particularly limited, and the conductive layer may be a conductive layer commonly used in the art. For example, the conductive layer includes a conductive agent and a binder.

The conductive agent is not particularly limited, and any conductive agent known in the art may be used, provided that the objective of this application can be achieved. For example, the conductive agent may include at least one of conductive carbon black (Super P), carbon nanotubes (CNTs), carbon nanofibers, or graphene. For example, carbon black (Super P) may be selected as the conductive agent. The binder is not particularly limited, and any binder well known in the art may be used, provided that the objective of this application can be achieved. For example, the binder may be selected from at least one of styrene butadiene rubber (SBR), polyvinyl alcohol (PVA), polytetrafluoroethylene ethylene (PTFE), sodium carboxymethyl cellulose (Na-CMC), or the like. For example, styrene butadiene rubber (SBR) may be selected as the binder.

The electrolyte of the lithium-ion battery in this application is not particularly limited, and any electrolyte well known in the art may be used, for example, an electrolyte in gel state, solid state, or liquid state. For example, a liquid electrolyte solution includes lithium salt and a non-aqueous solvent.

The lithium salt is not particularly limited, and any lithium salt well known in the art may be used, provided that the objective of this application can be achieved. For example, the lithium salt may include at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, or $LiPO_2F_2$. For example, $LiPF_6$ may be used as the lithium salt.

The non-aqueous solvent is not particularly limited, provided that the objective of this application can be achieved. For example, the non-aqueous solvent may include at least one of a carbonate compound, a carboxylate compound, an ether compound, a nitrile compound, or other organic solvents.

For example, the carbonate compound may include at least one of diethyl carbonate (DEC), dimethyl carbonate (DMC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, and trifluoromethylethylene carbonate.

This application further provides an electronic apparatus which includes the foregoing electrochemical apparatus.

In this application, the electronic apparatus may be any electrochemical apparatus in the art, for example, a laptop computer, a mobile phone, an electric motorbike, an electric vehicle, and an electric toy.

The terms used in this application are generally those commonly used by those skilled in the art. If they are inconsistent with the commonly used terms, the terms in this application shall prevail.

Specifically, in this application, the following terms have the following meanings.

Median particle size of inorganic particles: the median particle size of inorganic particles is represented by D50 on a volume basis, that is, the volume of inorganic particles with a particle size below D50 accounts for 50% of the volume of all particles.

Burrs: metal bumps and pits produced during tab welding.

Overhang (Overhang): referring to an amount (dimension difference) of a negative electrode plate hanging over a positive electrode plate, a separator hanging over a negative electrode plate, or a separator hanging over a positive electrode plate in a width direction or length direction.

Test Method

Capacity and Energy Density of Lithium-Ion Battery:

At room temperature, lithium-ion batteries were left standing for 60 minutes, then charged to 3.0 V at a rate of 0.2 C, discharged to a cut-off voltage at a rate of 0.5 C, and charged to a charge current of 0.01 C at a constant voltage, and left standing for 60 minutes. The lithium-ion batteries were charged to 2.8 V at a rate of 0.5 C. Capacities of the lithium-ion batteries were measured (in Ah), and energy densities were calculated (in Wh/L) based on volume of the lithium-ion batteries.

Drop Abuse Test Pass Rate:

a number of lithium-ion batteries that did not catch fire and explode in the drop abuse test divided by a total number of lithium-ion batteries in the parameter test.

The test method is as follows: measuring an initial capacity of an electrode assembly at room temperature at a current of 1.0 C, charging the electrode assembly to 4.2 V at a constant current of 1.0 C, then charging the electrode assembly at a constant voltage until the current dropped to 0.05 C, stopping charging and then leaving the electrode assembly standing for 1 hour; measuring an open circuit voltage and impedance; letting electrode assemblies drop freely at a height of 1 m (3.28 feet) onto concrete floor; dropping each lithium-ion battery once along each of positive and negative directions of three mutually perpendicular axes, meaning that a total of 6 drops were performed, and then leaving the electrode assemblies standing for 1 hour; measuring an open circuit voltage and impedance; and then measuring remaining capacity at room temperature at a current of 1.0 C, where the remaining capacity refers to a discharge capacity after full charge. If no lithium-ion battery leaks, smokes, catches fire, and explodes, protective apparatuses of the lithium-ion batteries are in good condition, remaining capacities after the test are not less than 90% of initial capacities, and impedance increases after the test are not higher than 50% of initial impedances, the test is regarded as pass, otherwise it is regarded as fail.

Puncture Resistance:

A microcomputer-controlled electronic universal testing machine (MTS-E44.104) was used to test puncture resistance of a porous layer.

Test process: disassembling a lithium-ion battery, using a laminated three-layer structure of a positive electrode plate, a spinning layer, and a negative electrode plate as a sample, placing the sample on an aluminum plate on a side of a press, placing a steel ball (made of iron and with a diameter of 5 mm) on the sample, applying a voltage of 10 V between two tabs, and applying pressure to a surface of the sample by using the aluminum plates on two sides, with a pressure speed in the vertical direction of 0.1 mm/min, where a pressure recorded when resistance changes sharply is the puncture resistance.

Porosity and Pore Diameter:

Preparing a battery separator (a spinning layer) as a disc with a diameter of 24 mm, and using a battery separator through-hole aperture analyzer CFP-1500AE to analyze. Parameters were as follows: pressure range: 0-500 psi; pressurized gas: $N_2$; and infiltration liquid: GalWick; and a porosity and pore diameter of the spinning layer were obtained.

Preparation Example 1

Preparation of Electrolyte

In a dry argon atmosphere, organic solvents ethylene carbonate, ethyl methyl carbonate, and diethyl carbonate were mixed at a mass ratio of EC:EMC:DEC=30:50:20 to obtain an organic solution, and then a lithium salt lithium hexafluorophosphate was added to the organic solution for dissolving, followed by uniform mixing to obtain a liquid electrolyte with a lithium salt concentration of 1.15 mol/L.

EXAMPLES

The following examples illustrate the electrode assembly in this application. These examples describe by using an example that the spinning layer is provided on a positive electrode plate. It should be understood that the spinning layer may alternatively be provided on a surface of a negative electrode plate. These examples can also achieve the objective of this application. A person skilled in the art should understand that these examples are also within the protection scope of this application.

Example 1

In the selected 333996 model, the positive electrode plate was 89.8 mm in width, and a welding region of the positive electrode plate corresponding to the negative electrode tab was affixed with green glue. Then a polyimide (PI, polyimide) spinning layer was prepared on the positive electrode plate by electrospinning, and in a width direction of the positive electrode plate, an edge of the spinning layer was 0.5 mm wider than an edge of the positive electrode plate. The negative electrode plate was 91 mm in width, and a welding region of the negative electrode plate corresponding to the tab was affixed with green glue. The spun positive electrode plate and the unspun negative electrode plate were made into an electrode assembly through stacking and winding. The lithium-ion battery in Example 1 was obtained after the electrode assembly was placed in an aluminum plastic film, sealed on the top side, injected with the electrolyte in Preparation Example 1, and packaged.

In this example, a porosity, a pore diameter, and a thickness of the spinning layer was 60%, 100 nm, and 10 μm respectively.

Example 2

In the selected 333996 model, the positive electrode plate was 89.8 mm in width, and a welding region of the positive electrode plate corresponding to the negative electrode tab was affixed with green glue. Then, on a portion of the positive electrode plate out of the welding region of the tab, a polyimide (PI, polyimide) spinning layer was prepared by electrospinning; and at the welding region of the positive electrode tab, a polyimide (PI, polyimide) spinning layer containing $Al_2O_3$ particles was prepared by local spinning, where a proportion of $Al_2O_3$ particles in a total volume of the separator was 30%. In a width direction of the positive electrode plate, an overall edge of the spinning layer was 0.5 mm wider than an edge of the positive electrode plate. The negative electrode plate was 91 mm in width, and a welding region of the negative electrode plate corresponding to the tab was affixed with green glue. The spun positive electrode plate and the unspun negative electrode plate were made into an electrode assembly through winding. The lithium-ion battery in Example 2 was obtained after the electrode assembly was placed in an aluminum plastic film, sealed on the top side, injected with the electrolyte in Preparation Example 1, and packaged.

In this example, a porosity, a pore diameter, and a thickness of the spinning layer was 40%, 150 nm, and 5 μm respectively, and a particle size of $Al_2O_3$ particles was 1 μm.

Example 3

In the selected 333996 model, the positive electrode plate was 89.8 mm in width, and a welding region of the positive electrode plate corresponding to the negative electrode tab was affixed with green glue. Then, on the positive electrode plate, a polyimide (PI, polyimide) spinning layer was prepared by electrospinning, and a welding region of the positive electrode tab was covered by a polyimide (PI, polyimide) spinning layer and a layer of $Al_2O_3$ particles by local spinning, where a ratio of a thickness of the $Al_2O_3$ particles layer to a thickness of the polyimide (PI, polyimide) spinning layer was 2:5. In a width direction of the positive electrode plate, an overall edge of the spinning layer was 0.5 mm wider than an edge of the positive electrode plate. The negative electrode plate was 91 mm in width, and a welding region of the negative electrode plate corresponding to the tab was affixed with green glue. The spun positive electrode plate and the unspun negative electrode plate were made into an electrode assembly through winding. The lithium-ion battery in Example 3 was obtained after the electrode assembly was placed in an aluminum plastic film, sealed on the top side, injected with the electrolyte in Preparation Example 1, and packaged.

In this example, a porosity, a pore diameter, and a thickness of the polyimide (PI, polyimide) spinning layer were 55%, 90 nm, and 8 μm respectively, and a particle size and a thickness of $Al_2O_3$ particles were 1 μm and 3.2 μm respectively.

Example 4

In the selected 333996 model, the positive electrode plate was 89.8 mm in width, and a welding region of the positive electrode plate corresponding to the negative electrode tab was affixed with green glue. Then, a polyimide (PI, polyimide) spinning layer was prepared on the negative electrode plate by electrospinning, and the negative electrode plate was 91 mm in width. In a width direction of the positive electrode plate, an edge of the spinning layer was 0.5 mm wider than an edge of the negative electrode plate. The unspun positive electrode plate and the spun negative electrode plate were made into an electrode assembly through winding. The lithium-ion battery in Example 4 was obtained after the electrode assembly was placed in an aluminum plastic film, sealed on the top side, injected with the electrolyte in Preparation Example 1, and packaged.

In this example, a porosity, a pore diameter, and a thickness of the spinning layer was 60%, 120 nm, and 10 μm respectively.

Example 5

In the selected 333996 model, the positive electrode plate was 89.8 mm in width, and a welding region of the positive electrode plate corresponding to the negative electrode tab was affixed with green glue. Then, a polyimide (PI, polyimide) spinning layer was prepared on the positive electrode plate by electrospinning, and in a width direction of the positive electrode plate, an edge of the spinning layer was 0.5 mm wider than an edge of the positive electrode plate. In addition, a polyimide (PI, polyimide) spinning layer was prepared on the negative electrode plate by electro spinning, the negative electrode plate was 91 mm in width, and an edge of the spinning layer was 0.5 mm wider than an edge of the negative electrode plate. The spun positive electrode plate and the spun negative electrode plate were made into an electrode assembly through winding. The lithium-ion battery in Example 5 was obtained after the electrode assembly was placed in an aluminum plastic film, sealed on the top side, injected with the electrolyte in Preparation Example 1, and packaged.

In this example, a porosity, a pore diameter, and a thickness of the spinning layer of the positive electrode plate were 45%, 1 μm, and 12 μm respectively, and a porosity, a pore diameter, and a thickness of the spinning layer of the negative electrode plate were 45%, 1 μm, and 12 μm respectively.

Comparative Example 1

In the selected 333996 model, the positive electrode plate was 89.8 mm in width, a contact area of the green glue and the electrode plate was 22×15 mm, and a membrane area on the glue was 135 mm², so a total area of the active material on two sides of the positive electrode covered by the green glue was 270 mm². A welding region of the positive electrode plate corresponding to the negative electrode tab was affixed with green glue. The negative electrode plate was 91 mm in width, and a welding region of the negative electrode plate corresponding to the tab was affixed with green glue. A 92.8 mm wide PE separator was selected as the separator. The positive electrode plate, the separator, and the negative electrode plate were made into an electrode assembly through winding. The lithium-ion battery in Comparative Example 1 was obtained after the electrode assembly was placed in an aluminum plastic film, sealed on the top side, injected with the electrolyte in Preparation Example 1, and packaged. Cell capacity of this lithium-ion battery was 2.36 Ah.

A difference between the widths of the electrode assemblies in Examples 1 to 3 and the width of the electrode assembly in Comparative Example 1 was: 92.8−91=1.8 mm; and a difference between the widths of the electrode assemblies in Examples 4 and 5 and the width of the electrode assembly in Comparative Example 1 was: 92.8−(91+0.5×2)=0.8 mm The test results are shown in Table 1.

TABLE 1

| No. | Energy density increase | Drop test pass rate |
| --- | --- | --- |
| Comparative Example | — | 5/10 |
| Example 1 | 2.35% | 10/10 |
| Example 2 | 2.35% | 10/10 |
| Example 3 | 2.35% | 10/10 |
| Example 4 | 1.27% | 10/10 |
| Example 5 | 1.27% | 10/10 |

It can be known from Table 1 that, in this application, the spinning layer was used to replace the green glue, preventing capacity losses caused by the green glue covering the electrode active material, thereby increasing energy density of the lithium-ion battery; in addition, because the spinning layer was directly compounded on the surface and side of the electrode plate, the possibility of short circuits between the positive and negative electrodes under the condition of abuse was eliminated, greatly increasing pass rate of abuse tests such as drop tests.

In this application, the conventional separator is replaced by a spinning layer, which covers the entire membrane region and part of the side surface of the electrode plate, where the spinning layer and the electrode plate are integrated as a whole. In a battery structure with an embedded tab, because a spinning layer is able to isolate metal burrs, the green glue originally affixed on the tab region can be replaced by the spinning layer, thereby eliminating the glue affixed on the tab region; in addition, the spinning layer does not block transport of lithium ions, allowing a capacity of a portion of the active material that is originally covered by the green glue to be utilized normally, thereby increasing energy density. Additionally, because the spinning layer covers the entire membrane region of the electrode plate, short circuits between the positive and negative electrodes are prevented under the condition of dropping and abuse, greatly enhancing the safety performance of the battery during dropping. In addition, under the condition that the spinning layer is only attached to the positive electrode, because the increase in the width of the positive electrode does not exceed the overhang (overhang) of the negative electrode and the positive electrode, the length of the electrode assembly only depends on the width of the negative electrode rather than that of the separator (generally the width of the separator exceeds that of the negative electrode), further increasing overall volumetric energy density of the lithium-ion battery.

The foregoing descriptions are merely preferable embodiments of this application, but are not intended to limit this application. Any modification, equivalent replacement, or improvement made without departing from the spirit and principle of this application shall fall within the protection scope of this application.

What is claimed is:

1. An electrode assembly, comprising:
   an electrode plate and an embedded tab provided on the electrode plate;
   wherein a spinning layer is provided on a surface of the electrode plate, the spinning layer covers the surface of the electrode plate and is in contact with the surface of the electrode plate, and the surface of the electrode plate comprises a surface of the tab;
   wherein a puncture resistance of the spinning layer on the surface of the tab is higher than a puncture resistance of the spinning layer out of the surface of the tab.

2. The electrode assembly according to claim 1, wherein a porosity and/or a pore diameter of the spinning layer on the surface of the tab is less than a porosity and/or a pore diameter of the spinning layer out of the surface of the tab; and/or
   a thickness of the spinning layer on the surface of the tab is greater than a thickness of the spinning layer out of the surface of tab.

3. The electrode assembly according to claim 1, wherein upper and lower edges of the spinning layer are 0.1 mm to 10 mm wider than upper and lower edges of the electrode plate respectively.

4. The electrode assembly according to claim 1, wherein the spinning layer comprises a polymer; and the polymer comprise at least one of polyvinylidene fluoride, polyimide, polyamide, polyacrylonitrile, polyethylene glycol, polyethylene oxide, polyphenylene oxide, polypropylene carbonate, polymethyl methacrylate, polyethylene glycol terephthalate, poly(vinylidene fluoride-hexafluoropropylene), poly(vinylidene fluoride-co-chlorotrifluoroethylene), or derivatives thereof.

5. The electrode assembly according to claim 1, wherein the spinning layer further comprises inorganic particles and/or low-melting-point polymer particles.

6. The electrode assembly according to claim 5, wherein the spinning layer comprises the inorganic particles; and the inorganic particles comprise at least one of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, lithium phosphate, lithium titanium phosphate, lithium aluminum titanium phosphate, lithium lanthanum titanate, lithium germanium thiophosphate, lithium nitride, $SiS_2$ glass, $P_2S_5$ glass, $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramics, or garnet ceramics.

7. The electrode assembly according to claim 5, wherein the spinning layer comprises the low-melting-point polymer particles; the low-melting-point polymer particles comprise at least one of polystyrene, polyethylene, ethylene-propylene copolymer, ethylene-vinyl acetate copolymer, acrylonitrile-butadiene-styrene, polylactic acid, polyvinyl chloride, polyvinyl butyral, or polyacrylate.

8. The electrode assembly according to claim 5, wherein a particle size of the inorganic particle and/or the low-melting-point polymer particle ranges from 0.001 μm to 10 μm.

9. The electrode assembly according to claim 1, wherein a porosity of the spinning layer ranges from 30% to 95%.

10. The electrode assembly according to claim 1, wherein a pore diameter of the spinning layer ranges from 20 nm to 30 μm.

11. The electrode assembly according to claim 1, wherein a thickness of the spinning layer ranges from 1 μm to 20 μm.

12. An electrochemical apparatus, comprising an electrode assembly, the electrode assembly comprises:
   an electrode plate and an embedded tab provided on the electrode plate; wherein
   a spinning layer is provided on a surface of the electrode plate, the spinning layer covers the surface of the electrode plate and is in contact with the surface of the electrode plate, and the surface of the electrode plate comprises a surface of the tab;
   wherein a puncture resistance of the spinning layer on the surface of the tab is higher than a puncture resistance of the spinning layer out of the surface of the tab.

13. The electrochemical apparatus according to claim 12, wherein upper and lower edges of the spinning layer are 0.1 mm to 10 mm wider than upper and lower edges of the electrode plate respectively.

14. The electrochemical apparatus according to claim 12, wherein a thickness of the spinning layer ranges from 1 μm to 20 μm.

15. An electronic apparatus, comprising the electrochemical apparatus according to claim 12.

* * * * *